No. 818,097. PATENTED APR. 17, 1906.
J. C. F. KELCH.
LAND ROLLER.
APPLICATION FILED JAN. 10, 1906.

UNITED STATES PATENT OFFICE.

JOHN C. F. KELCH, OF CELINA, OHIO.

LAND-ROLLER.

No. 818,097.  Specification of Letters Patent.  Patented April 17, 1906.

Application filed January 10, 1906. Serial No. 295,447.

*To all whom it may concern:*

Be it known that I, JOHN C. F. KELCH, a citizen of the United States, residing at Celina, in the county of Mercer and State of Ohio, have invented a new and useful Land-Roller, of which the following is a specification.

This invention relates to land-rollers, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a longitudinal section, and Fig. 2 is a transverse section, of the improved device.

The improved device consists of a tubular member 10, having closed ends 11 12 and formed of concrete or a similar compound, with a plurality of tie-wires 13 spaced and embedded within the material with the ends bent laterally, as at 14 15, for firmly binding the tubular member and preventing fracture of the same. Extending centrally through the end portions 11 12 of the roller are metal bearings 16 17 for a supporting-shaft, (indicated at 20,) the outer faces of the bearings being concaved, as at 18 19, for receiving the concrete material when the roller is formed, and thus preventing the bearings from becoming loosened or displaced.

The device is very simple in construction, can be formed in any required size or weight and with any required thickness of walls. The proportions of the materials composing the "concrete" or "beton" may be varied as required to produce the requisite "hardness" or strength.

Having thus described the invention, what is claimed is—

1. A land-roller consisting of a tubular member having closed ends and with metal bearing extending centrally through said ends said bearing having concaved outer sides for receiving the concrete material.

2. A land-roller consisting of a tubular member of concrete having spaced tie-rods embedded therein said rods bent laterally at the ends and with the ends of the tubular member closed, and metal bearings extending through said closed ends and provided with concaved outer surfaces for receiving the concrete material.

In testimony that I claim the foregoing as my own I have hereto affixed my signature in the presence of two witnesses.

JOHN C. F. KELCH.

Witnesses:
 E. F. ROMER,
 W. E. TOUVILLE.